US012675066B2

(12) United States Patent
Uchiyama

(10) Patent No.: US 12,675,066 B2
(45) Date of Patent: Jul. 7, 2026

(54) IMAGE FORMING APPARATUS

(71) Applicant: CANON KABUSHIKI KAISHA, Tokyo (JP)

(72) Inventor: Akihiko Uchiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 19/019,126

(22) Filed: Jan. 13, 2025

(65) Prior Publication Data

US 2025/0237978 A1 Jul. 24, 2025

(30) Foreign Application Priority Data

Jan. 19, 2024 (JP) ................................ 2024-006650

(51) Int. Cl.

| | |
|---|---|
| ***G03G 15/08*** | (2006.01) |
| ***G03G 15/00*** | (2006.01) |
| ***G03G 15/01*** | (2006.01) |
| ***G03G 15/16*** | (2006.01) |

(52) U.S. Cl.

CPC ..... *G03G 15/1675* (2013.01); *G03G 15/0115* (2013.01); *G03G 15/0131* (2013.01); *G03G 15/0189* (2013.01); *G03G 15/1605* (2013.01); *G03G 15/5008* (2013.01); *G03G 15/757* (2013.01)

(58) Field of Classification Search

CPC ................................................ H04N 1/40037
USPC ........................................................ 399/51
See application file for complete search history.

(56) References Cited

U.S. PATENT DOCUMENTS

| | | | | |
|---|---|---|---|---|
| 8,160,480 B2 * | 4/2012 | Mochizuki | ......... | G03G 15/0131 399/302 |
| 11,308,369 B2 * | 4/2022 | Omata | .................. | G06K 15/14 |

FOREIGN PATENT DOCUMENTS

| | | |
|---|---|---|
| JP | 2003302806 A | 10/2003 |
| JP | 2004233673 A | 8/2004 |
| JP | 2018146827 A | 9/2018 |
| JP | 2023178030 A | 12/2023 |

* cited by examiner

*Primary Examiner* — Quana Grainger
(74) *Attorney, Agent, or Firm* — Canon U.S.A., Inc., IP Division

(57) ABSTRACT

Provided is a control unit that executes a first mode in which a developer bearing member rotates with respect to an image bearing member at a first circumferential speed ratio, and a second mode in which the developer bearing member rotates with respect to the image bearing member at a second circumferential speed ratio greater than the first circumferential speed ratio. In the second mode, in a case where information indicating that output image data includes acquiring only a first pattern of first gradation, the control unit controls to apply a first transfer voltage, and, in a case where information indicating acquiring output image data that includes the first pattern and a second pattern of second gradation with lower density than the first gradation, the control unit controls to apply a second transfer voltage having an absolute value less than the first transfer voltage.

15 Claims, 9 Drawing Sheets

IMAGE FORMING APPARATUS

BACKGROUND

Field

The present disclosure relates to an image forming apparatus.

Description of the Related Art

Some electrophotographic color image forming apparatuses have a wide color gamut image formation mode with an extended color reproduction range (color gamut), aside from a normal image formation mode.

In order to realize a wide color gamut, methods are employed of making an amount of developer (toner) applied to a recording material larger than that in the normal image formation mode. For example, Japanese Patent Application Laid-Open No. 2004-233673 discusses a method of extending a color gamut of a toner image to be formed with particularly two or more types of toner represented by a secondary color superposed by changing each circumferential speed ratio between the photosensitive drum and the development roller to increase the amount of toner to be supplied to the photosensitive drum.

However, regarding the configuration discussed in Japanese Patent Application Laid-Open No. 2004-233673, in the wide color gamut image formation mode, a transfer setting with a higher transfer strength than that in the normal image formation mode is made in such a manner that enables a toner image even with a larger amount of toner than that in the normal image formation mode to be appropriately transferred over a recording material. On the other hand, there is demand in the market to accurately reproduce the corporate colors of a corporate logo, for example. A corporate logo is often arranged at one point in a small part on a document. Then, even for the image with a remaining large part corresponding to a low-density halftone image with a low amount of toner, with the configuration discussed in Japanese Patent Application Laid-Open No. 2004-233673, the wide color gamut image formation mode is selected.

In such a case, the transfer strength becomes excessive for the halftone image formed in the large part on the recording material, generating an abnormal electric discharge image over a wide region on the recording material, which deteriorates image quality.

SUMMARY

In view of the above-described circumstances, the present disclosure is directed to providing an image forming apparatus that can reproduce desirable coloring in a wide color gamut image formation mode.

An aspect of the present disclosure provides an image forming apparatus that executes an image formation operation for forming an image on a recording material, with the image forming apparatus including a rotatable image bearing member; an exposure unit configured to form an electrostatic latent image on a surface of the image bearing member based on output image data; a rotatable developer bearing member configured to form a toner image by supplying a developer to the surface of the image bearing member and developing the electrostatic latent image formed on the surface of the image bearing member; an intermediate transfer member to which the toner image formed on the surface of the image bearing member is transferred at a transfer portion, the transfer portion being formed by the intermediate transfer member contacting the surface of the image bearing member; a transfer member configured to transfer the toner image transferred to a surface of the intermediate transfer member to the recording material; a drive unit configured to drive the image bearing member and the developer bearing member; a transfer voltage application unit configured to apply a transfer voltage to the transfer member; an acquisition unit configured to acquire information regarding the output image data; and a control unit configured to control the drive unit and the transfer voltage application unit. The control unit is configured to control execution of a first mode in which the developer bearing member rotates with respect to the image bearing member at a first circumferential speed ratio, and a second mode in which the developer bearing member rotates with respect to the image bearing member at a second circumferential speed greater ratio than the first circumferential speed ratio. When the control unit controls execution of the image formation operation in the second mode: (i) in response to the acquired information indicating that the output image data includes a first pattern without including a second pattern, a first gradation of the first pattern is acquired by the acquisition unit and the control unit controls application of a first transfer voltage to transfer the toner image of the first pattern to the recording material, and (ii) in response to the acquired information indicating that the output image data includes the first pattern and the second pattern, a second gradation of the second pattern with lower density than the first gradation is acquired by the acquisition unit, and the control unit controls application of a second transfer voltage with an absolute value less than the first transfer voltage to transfer the toner image of the first pattern and the second pattern to the recording material.

Further features of the present disclosure will become apparent from the following description of exemplary embodiments with reference to the attached drawings.

DESCRIPTION OF THE EMBODIMENTS

Hereinafter, an image forming apparatus according to exemplary embodiments of the present disclosure will be described in detail. Unless otherwise specific description is given, the dimensions, the materials, and the shapes of components described in the present exemplary embodiment, and their relative arrangements are not intended to limit the scope of the present disclosure.

Figure 1:
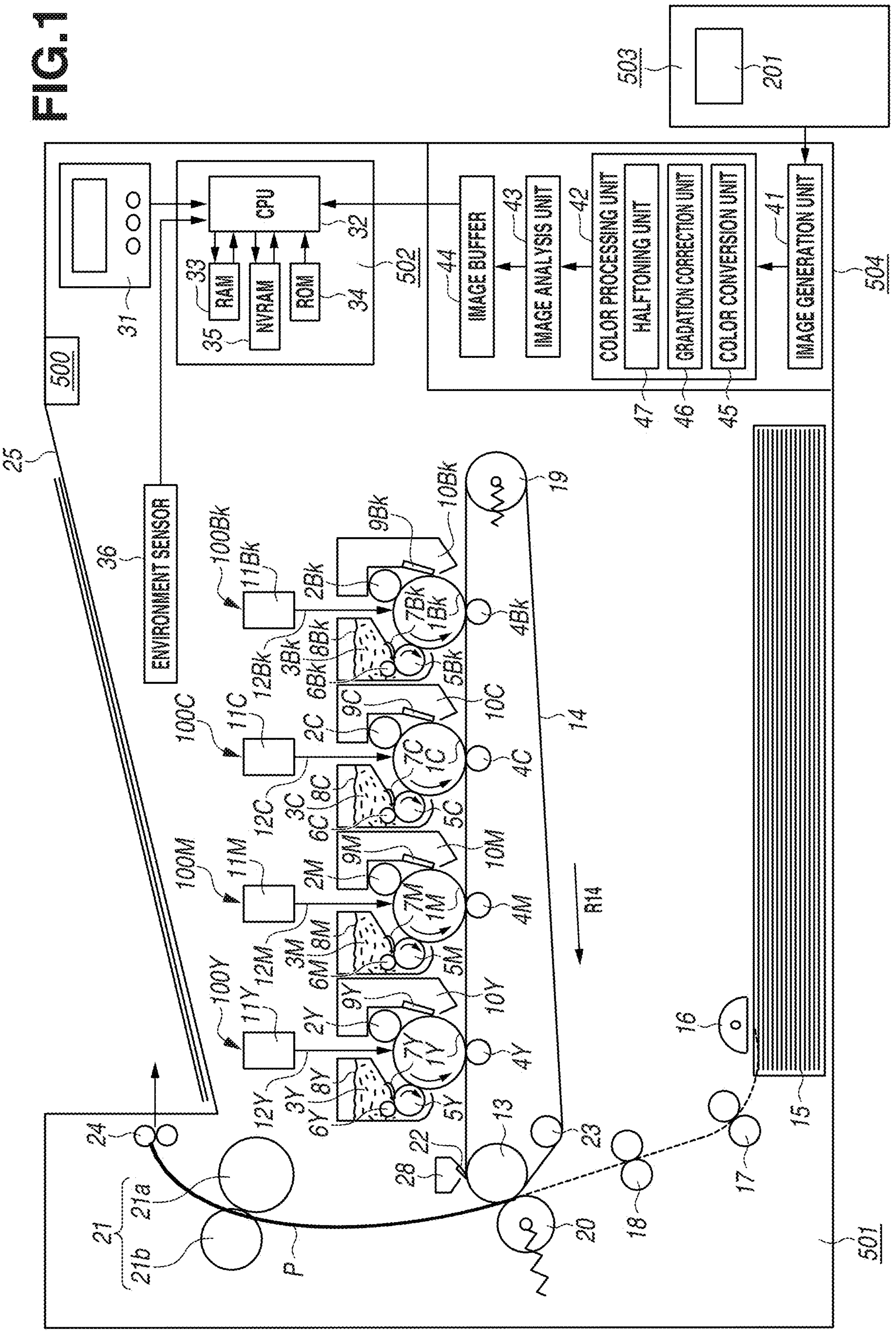
FIG. 1 is a longitudinal sectional view illustrating a schematic configuration of an image forming apparatus according to a first exemplary embodiment.

A first exemplary embodiment will be described. An image forming apparatus 500 according to the present exemplary embodiment that is illustrated in FIG. 1 is a tandem intermediate transfer full-color image forming apparatus that uses an intermediate transfer member serving as an image bearing member, with FIG. 1 providing a longitudinal sectional view illustrating a schematic configuration of the image forming apparatus 500.

In an engine unit 501, four image forming units (i.e., image forming units 100Y, 100M, 100C, and 100Bk respectively forming yellow (Y), magenta (M), can (C), and black (Bk) toner images) are adjacently arranged from upstream to downstream. With the image forming apparatus 500 installed, an intermediate transfer belt 14 serving as an intermediate transfer member that is stretched around rollers 13, 19, and 23 is arranged below the image forming units 100Y, 100M, 100C, and 100Bk in the direction of gravitational force.

As an example of the intermediate transfer belt 14 serving as an intermediate transfer member of the present exemplary embodiment, a resin belt containing polyethylene naphthalate (PEN) as the principal ingredient and having a thickness of 100 μm and a volume resistivity of 10E10 Ω·cm was used. The volume resistivity was measured under the condition that 250 V is applied for 30 seconds in an environment of 23° C. and 50% RH, using a Hiresta UP MCP-HT450, a high resistivity meter and a measurement probe UR-100 both manufactured by DIA Instruments.

As the intermediate transfer belt 14, a resin material, such as polyvinylidene fluoride (PVdF), polyamide, polyethylene terephthalate (PET), or polycarbonate, can be used which has a thickness of 50 to 200 μm and a volume resistivity of approximately 10E9 to 10E16 Ω·cm. Further, as appropriate, the volume resistivity can be adjusted to approximately 10E7 to 10E11 Ω·cm with a conductive filler, such as carbon, ZnO, $SnO_2$, and $TiO_2$ dispersed in these materials.

The image forming units 100Y, 100M, 100C, and 100Bk include integrated process cartridges including drum units 10Y, 10M, 10C, and 10Bk, and developing units 8Y, 8M, 8C, and 8Bk may serve as development devices, respectively. Among these, the drum units 10Y, 10M, 10C, and 10Bk include photosensitive drums 1Y, 1M, 1C, and 1Bk, respectively, each having an organic photoconductor (OPC) photosensitive layer. The drum units 10Y, 10M, 10C, and 10Bk further include cleaning blades 9Y, 9M, 9C, and 9Bk that are made of elastic rubber, and charging rollers 2Y, 2M, 2C, and 2Bk, respectively.

The developing units 8Y, 8M, 8C, and 8Bk also include development rollers 5Y, 5M, 5C, and 5Bk (collectively referred to as development rollers 5) serving as developer bearing members, respectively. The developing units 8Y, 8M, 8C, and 8Bk further include toners 3Y, 3M, 3C, and 3Bk serving as developer, toner application rollers 6Y, 6M, 6C, and 6Bk serving as supply rollers, and toner regulation blades 7Y, 7M, 7C, and 7Bk serving as regulation members, respectively. As the toners 3Y, 3M, 3C, and 3Bk, non-magnetic one-component polymerized toners configured to be charged with amounts of charge of −20 to −50 μC/mg are used. The normal charge polarity of the toners 3Y, 3M, 3C, and 3Bk, i.e. normal charge polarity of the developer, is the negative polarity. The image forming apparatus 500 employs a reversal development method.

Exposure devices 11Y, 11M, 11C, and 11Bk serving as exposure units and each including a scanner unit that executes scanning with laser light using a polygonal mirror are provided above the respective image forming units 100Y, 100M, 100C, and 100Bk, respectively. The exposure devices 11Y, 11M, 11C, and 11Bk form electrostatic latent images by emitting scanning beams 12Y, 12M, 12C, and 12Bk modulated based on image data onto the respective photosensitive drums 1Y, 1M, 1C, and 1Bk serving as image bearing members. The spot diameter of the scanning beams 12Y, 12M, 12C, and 12Bk is approximately 60 μm on the respective photosensitive drums 1Y, 1M, 1C, and 1Bk, allowing an image formation with a resolution of 600 dots per inch (dpi) in both the main scanning direction and the sub scanning direction. In the present exemplary embodiment, image data for each color is represented by eight-bit data, i.e., 256 levels from 00h to FFh (h relative to hexadecimal display). Image data FFh indicates the solid image. The image density becomes lower as the image data gets smaller, and the image becomes a non-image (solid white image) at 00h. In some cases, image data will be represented by a percentage from 0% to 100% as from 00h to FFh.

Image data represented by an eight-bit value closer to FFh than 00h is on the high gradation side, and image data represented by an eight-bit value closer to 00h than FFh is on the low gradation side. Further, image data is in some cases decimally represented with dec added, and FFh representing a solid image serving as a first pattern is 255 dec, and 80h representing a halftone image serving as a second pattern is 128 dec, as described herein.

Primary transfer rollers 4Y, 4M, 4C, and 4Bk, which serve as primary transfer members that press the intermediate transfer belt 14 against the photosensitive drums 1Y, 1M, 1C, and 1Bk from below, are provided on the inner surface of the intermediate transfer belt 14.

Figure 7:
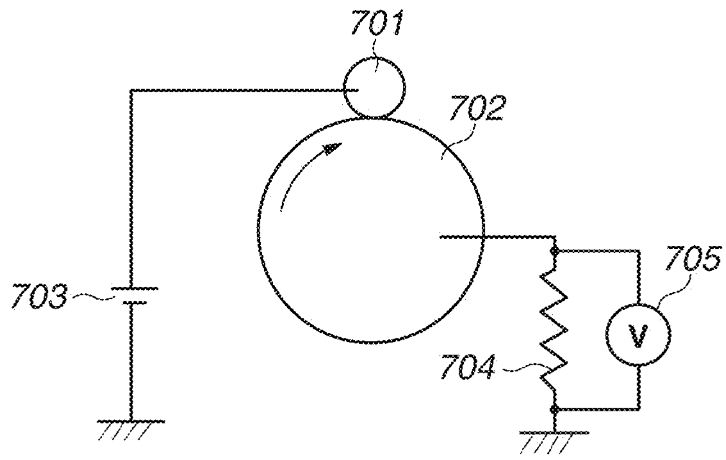
FIG. 7 is a diagram illustrating a resistance measurement method for a roller member according to the first exemplary embodiment.
Figure 8:
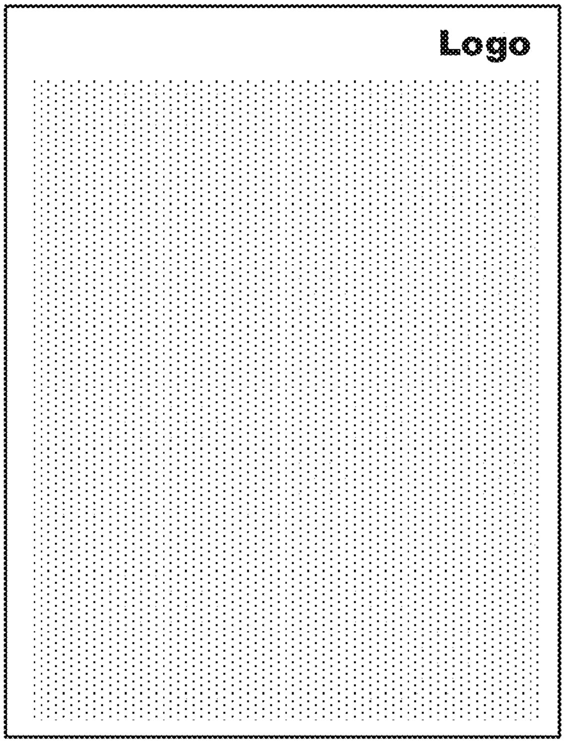
FIG. 8 illustrates an example of a document with a corporate logo thereon.

The primary transfer rollers 4Y, 4M, 4C, and 4Bk transfer toner images on the photosensitive drums 1Y, 1M, 1C, and 1Bk, respectively, onto the intermediate transfer belt 14. In the present exemplary embodiment, the primary transfer rollers 4Y, 4M, 4C, and 4Bk each have a diameter of φ8 consisting of a metal core with a diameter of @6 covered with a foam sponge member made of nitrile rubber (NBR). The resistance value of each primary transfer roller is 10E6Ω. The measurement of the resistance value R is performed by measuring a voltage V using a method, as illustrated in FIG. 7, in the environment with 23° C. and 50% RH. More specifically, a roller 701 of which the resistance value is to be measured is brought into contact with an aluminum cylinder 702 with a diameter of φ30 at a total pressure of 9.8 N (1 kgf), and rotated at 30 rounds per minute (rpm), and the current flowing when a voltage of +1000 V is applied from a power source 703 is measured. The current is found by measuring a voltage Vr applied between the terminals of a resistor 704 of 100Ω using a voltmeter 705. Then, a roller resistance R is found by multiplying the applied voltage by 100/Vr.

Figure 9:
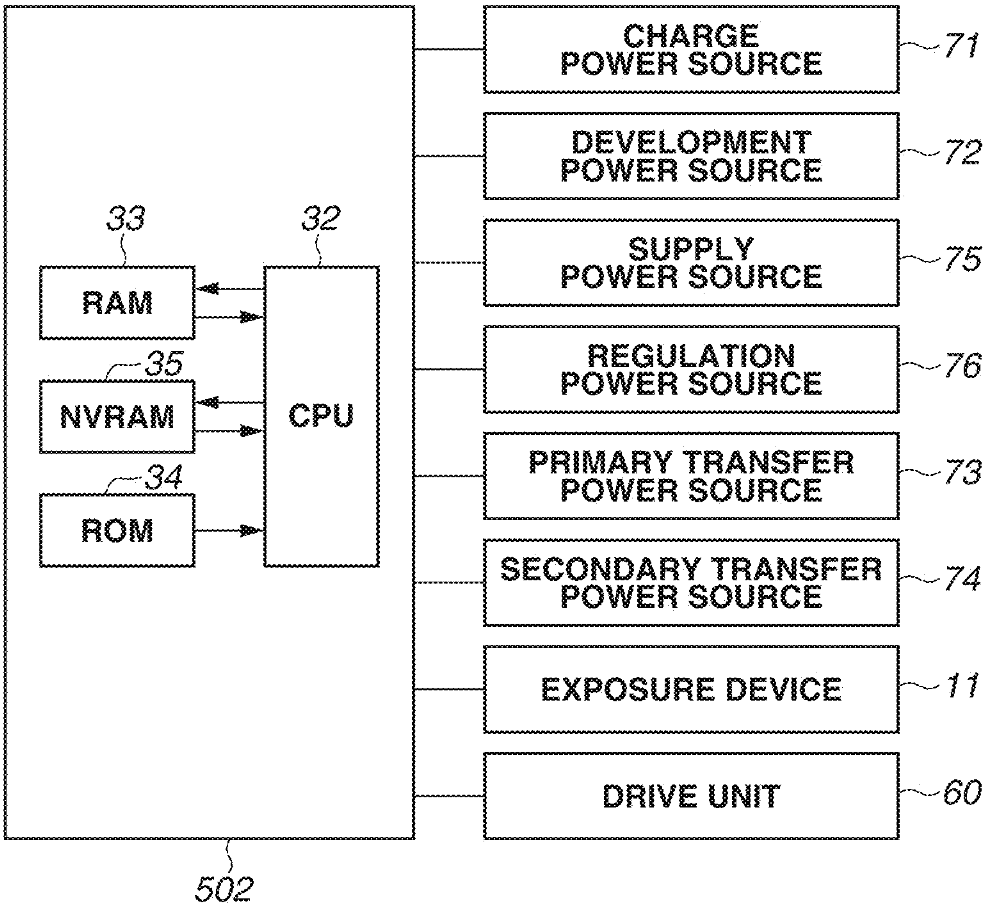
FIG. 9 is a block diagram illustrating a control configuration according to the first exemplary embodiment.

From a primary transfer power source 73 serving as a primary transfer voltage application unit, as illustrated in FIG. 9, a transfer voltage (bias) with positive polarity that is controlled to be a constant voltage or a constant current, the positive polarity being the opposite polarity to the normal polarity of the toner, is applied to these primary transfer rollers 4Y, 4M, 4C, and 4Bk. Then, the toner images formed on the photosensitive drums 1Y, 1M, 1C, and 1Bk are transferred onto the intermediate transfer belt 14.

A secondary transfer roller 20 serving as a secondary transfer member transfers a toner image formed on the intermediate transfer belt 14 onto a recording material P. In the present exemplary embodiment, the secondary transfer roller 20 has a diameter of φ18 consisting of a metal core with a diameter of φ8 covered with a foam sponge member made of NBR. The resistance value of the secondary transfer roller is 10E7Ω obtained by measurement using the above-described roller resistance measurement method. From a secondary transfer power source 74 serving as a secondary transfer voltage application unit, see in FIG. 9, a voltage with positive polarity that is controlled to be a constant voltage or a constant current is applied to the secondary transfer roller 20.

Out of the three rollers 13, 19, and 23 supporting the intermediate transfer belt 14, the roller 13 serves both as a drive roller and a secondary transfer counter roller, and forms a transfer portion as a secondary transfer nip together with the secondary transfer roller 20 via the recording material P, while driving and conveying the intermediate transfer belt 14 in a direction indicated by arrow R14. The roller 23 is an auxiliary roller, and is provided to maintain a predetermined angle between the surfaces of the recording material P and the intermediate transfer belt 14 near the secondary transfer nip, and to prevent abnormal electrical discharge from occurring between the recording material P and the toner image on the intermediate transfer belt 14. The roller 19 is a tension roller, and is provided to stretch the intermediate transfer belt 14 at a predetermined tension.

Downstream of the roller 13, a cleaning member 22 including an elastic blade for cleaning the toner remaining on the intermediate transfer belt 14 that is not transferred to the recording material P at the secondary transfer nip is arranged.

A fixing device 21 includes a fixing roller 21*a* and a pressure roller 21*b*, and is provided to melt and fix the toner image formed on the recording material P.

FIG. 1 illustrates a control unit 502 of the image forming apparatus 500. The control unit 502 can communicate with an image processing unit 504 to be described below, and the control unit 502 controls the operation of the engine unit 501 in accordance with instructions from the image processing unit 504.

Aside from the exposure devices 11Y, 11M, 11C, and 11Bk, a random access memory (RAM) 33, a read-only memory (ROM) 34, and a nonvolatile random access memory (NVRAM) 35 are connected to a central processing unit (CPU) 32. The ROM 34 is a read-only storage unit (memory), and, in the ROM 34, programs for the CPU 32 controlling the image forming apparatus 500 and various types of data are written. The RAM 33 is a readable/writable memory, and data in the ROM 34 is loaded onto the RAM 33 and various types of data are stored therein. The NVRAM 35 is a readable/writable memory in which recorded content is held even when the power of the image forming apparatus is shut off. An environment sensor 36 includes a temperature sensor and a relative humidity sensor. Temperature information regarding the temperature of the inside of the engine unit 501, and relative humidity information are taken into the CPU 32, and used for the control of the engine unit 501. An operation panel 31 for the user to input various settings and issue instructions, and to notify the user of information is connected to the CPU 32, serving as a control unit.

FIG. 9 is a block diagram illustrating a control configuration of at least a part of the image forming apparatus 500 according to the present exemplary embodiment. Via electrical connection, signals indicating various types of information are input to the control unit 502, and also output from the control unit 502. The control unit 502 performs the processing of signals input from various process devices and sensors, and the processing of signals to be output for issuing operation instructions to various process devices. The image processing unit 504 provided in the image forming apparatus 500 inputs various signals to an external device (host apparatus) 503 and receives various signals output therefrom, and inputs various signals to the control unit 502 and receives various signals output therefrom. In response to an instruction from the image processing unit 504, the control unit 502 controls operations of the image forming apparatus 500 in accordance with a predetermined control program and a reference table.

The control unit 502 includes the CPU 32 serving as an arithmetic processing unit being a main component that performs various types of calculation processing, and a main body memory, such as the RAM 33, the ROM 34, and the NVRAM 35 (nonvolatile memory) being storage components serving as storage units storing information. Detection results of sensors, count results of a counter, and calculation results are temporarily stored in the RAM 33. In addition, control programs, and data tables preliminarily obtained through experiments are stored in the ROM 34. In addition, count results of a counter, various types of setting information, and results of sensors are stored in the NVRAM 35. Component to be controlled in the image forming apparatus 500, sensors, and the counter are connected to the control unit 502. The control unit 502 performs the control of a predetermined image formation sequence by controlling input-output of various signals and the drive timing of each component.

The control unit 502 performs the control of, for example, a charge power source 71 (FIG. 9) serving as a charging voltage application unit, a development power source 72 serving as a development voltage application unit, a supply power source 75, a regulation power source 76, the exposure devices 11, the primary transfer power source 73, the secondary transfer power source 74, and a drive unit 60.

The drive unit 60 includes a drive motor serving as a drive source, and a drive transmission member. Drive sources that drive rotary members, such as the photosensitive drums 1 and the development rollers 5, can be independently provided, or at least a part of the rotary members can be driven by a common drive source. In additions, drive sources that drive components for the respective colors can be independently provided, or at least a part of the components for the respective colors can be driven by a common drive source.

The image forming apparatus 500 executes an image formation operation (print job) that includes a series of operations of forming an image or images on one or a plurality of pieces of the recording material P and outputting the formed image(s) and is to be started in response to a start instruction. The image formation operation generally includes an image formation process, a pre-process (a pre-rotation process, a pre-print operation), a paper-to-paper process to be performed in the case of forming images on a plurality of pieces of the recording material P, and a post-process (a post-rotation process, a post-print operation). The image formation process is a process performed in a period during which the formation of an electrostatic latent image of an image to be actually formed on the recording material P and output, the formation of a toner image, and the primary transfer and the fixing of the toner image are performed, and an image formation time refers to this period. More specifically, the timing of the image formation time varies depending on the positions where processes of charging, exposure, development, primary transfer, secondary transfer, and fixing are performed. The pre-process is a process performed in a period from the input of a start instruction to the start of actual image formation, which is a period during which a preparation operation prior to the image formation process is performed. The paper-to-paper process is a process performed in a period corresponding to an interval between the recording material P and the recording material P when image formation is consecutively performed on a plurality of pieces of the recording material P (consecutive image formation). The post-print process is process performed in a period during an organizing operation (preparation operation) after the image formation process is performed. A non-image formation time is a period other than the image formation time, and includes the pre-process, the paper-to-paper process, and the post-process, which have been descried above, and further includes another pre-rotation process as a preparation operation to be performed when the power of the image forming apparatus 500 is input or at the time of recovery from a sleep state.

The image forming apparatus 500 is connected to a host computer 503 in a stand-alone mode or via a network. An image generated by application software in the host computer 503 is output as print information via a printer driver 201, and transmitted to the image processing unit 504. As the print information, a printer description language called a page description language (PDL) including drawing commands for characters, graphics, and images are used.

The image processing unit 504 includes an image generation unit 41, a color processing unit 42, an image analysis unit 43, and an image buffer 44. The print information transmitted to the image processing unit 504 is analyzed by the image generation unit 41 and subjected to rasterizing processing, being converted into bitmap image data pieces respectively having red (R), green (G), and blue (B) colors at 600 dpi adapted to the resolution of the image forming apparatus 500 and the size of an image to be printed. Then, the bitmap image data are transmitted to the color processing unit 42.

The color processing unit 42 includes a color conversion unit 45, a gradation correction unit 46, and a halftoning unit 47. The R, G, and B bitmap image data transmitted to the color processing unit 42 are color-converted as follows. In the color conversion unit 45, the R, G, and B bitmap image data pieces are color-converted into Y, M, C, and Bk image data pieces, respectively, using a data conversion table defining a correspondence between R, G, and B image data and Y, M, C, and Bk image data, which is called a color table. Further, in the gradation correction unit 46, a gradation correction is performed by converting image data in such a manner that the image data and the density of an image to be output by the engine unit 501 satisfy a predetermined relationship. The gradation correction is performed using a look-up table (LUT) indicating a correspondence between input image data and image data to be output.

The gradation-corrected image data is further subjected to gradation expression processing, such as dithering, in the halftoning unit 47, and output image data is generated. After the configuration of the image data is analyzed by the image analysis unit 43, the output image data is stored into the image buffer 44, and transmitted to the control unit 502 at a predetermined timing.

In a normal image formation mode as a first mode, on the start of an image formation, the photosensitive drums 1Y, 1M, 1C, and 1Bk and the intermediate transfer belt 14 start to rotate in arrow directions by driving force applied by the drive unit 60, to drive the intermediate transfer belt 14 at a predetermined process speed (160 mm/s, for example). Electrical discharge occurs between the photosensitive drums 1Y, 1M, 1C, and 1Bk and the charging rollers 2Y, 2M, 2C, and 2Bk to which a predetermined charging voltage (approximately −1000 V) is applied by the charge power source 71, uniformly charging the photosensitive drums 1Y, 1M, 1C, and 1Bk to a surface potential of approximately −450 V. A surface potential of approximately −450 V will be referred to as a dark area potential Vd. Subsequently, electrostatic latent images based on the output image data are formed using the scanning beams 12Y, 12M, 12C, and 12Bk from the exposure devices 11Y, 11M, 11C, and 11Bk. The surface potential of the photosensitive drum 1 with the electrostatic latent image of a solid image formed thereon is approximately −100 V. A surface potential of approximately −100 V will be referred to as a light area potential V1.

At this time, an electrostatic latent image of each color is formed at a predetermined timing suitable for the corresponding color in such a manner that four color images are superposed on the intermediate transfer belt 14 to later become a full-color image. As the exposed photosensitive drums 1Y, 1M, 1C, and 1Bk further rotate, the electrostatic latent images on the photosensitive drums 1Y, 1M, 1C, and 1Bk are visualized (developed) using the respective development rollers 5Y, 5M, 5C, and 5Bk to which a development voltage of approximately −300 V is applied by the development power source 72. The development rollers 5Y, 5M, 5C, and 5Bk rotate in the arrow directions (i.e., the forward directions with respect to the rotation directions of the photosensitive drums 1Y, 1M, 1C, and 1Bk). Then, Y, M, C, and Bk toner images are respectively formed on the photosensitive drums 1Y, 1M, 1C, and 1Bk. As the toner image on the photosensitive drums 1Y further rotate, the toner image is transferred onto the intermediate transfer belt 14 by the primary transfer rollers 4Y to which a primary transfer voltage of approximately +800 V is applied by the primary transfer power source 73. Then, in synchronization with the conveyance of the intermediate transfer belt 14, the M, C, and Bk toner images are sequentially transferred onto the intermediate transfer belt 14 by the primary transfer rollers 4M, 4C, and 4Bk to which primary transfer voltages of approximately +850 V, +900 V, and +950 V are applied, respectively. Then, a toner image of four colors is formed on the intermediate transfer belt 14.

Sheets of the recording material P stacked in a sheet feeding cassette 15 are fed by a semilunar sheet feeding roller 16, separated one by one by a separation roller 17, conveyed up to a registration roller 18, and once stopped. The once-stopped sheet of the recording material P is supplied by the registration roller 18 to the secondary transfer nip in synchronization with the timing at which the four-color toner image formed on the intermediate transfer belt 14 reaches the secondary transfer nip. Then, a secondary transfer voltage of approximately +1.5 kV to +3.5 kV is applied by the secondary transfer power source 74, and the toner image on the intermediate transfer belt 14 is transferred onto the recording material P. In the present exemplary embodiment, the secondary transfer voltage is set to +2.5 kV.

The recording material P with the toner image transferred thereon is separated from the intermediate transfer belt 14, and conveyed to the fixing device 21. Then, in the fixing device 21, the recording material P is subjected to heat and pressure applied by the fixing roller 21*a* and the pressure roller 21*b*, melting occurs to fix the toner image to the surface of the recording material P, and the fixed recording material P is discharged to a discharge tray 25 by a discharge roller pair 24.

Residual toners remaining on the photosensitive drums 1Y, 1M, 1C, and 1Bk are removed by the respective cleaning blades 9Y, 9M, 9C, and 9Bk, respectively, without being transferred to the intermediate transfer belt 14 in the primary transfer.

Residual toner remaining on the intermediate transfer belt 14 is removed at a cleaning nip being a contact portion between an edge portion of the cleaning member 22 and the intermediate transfer belt 14, and collected into a waste toner container 28, without being transferred to the recording material P in a secondary transfer.

Figure 2:
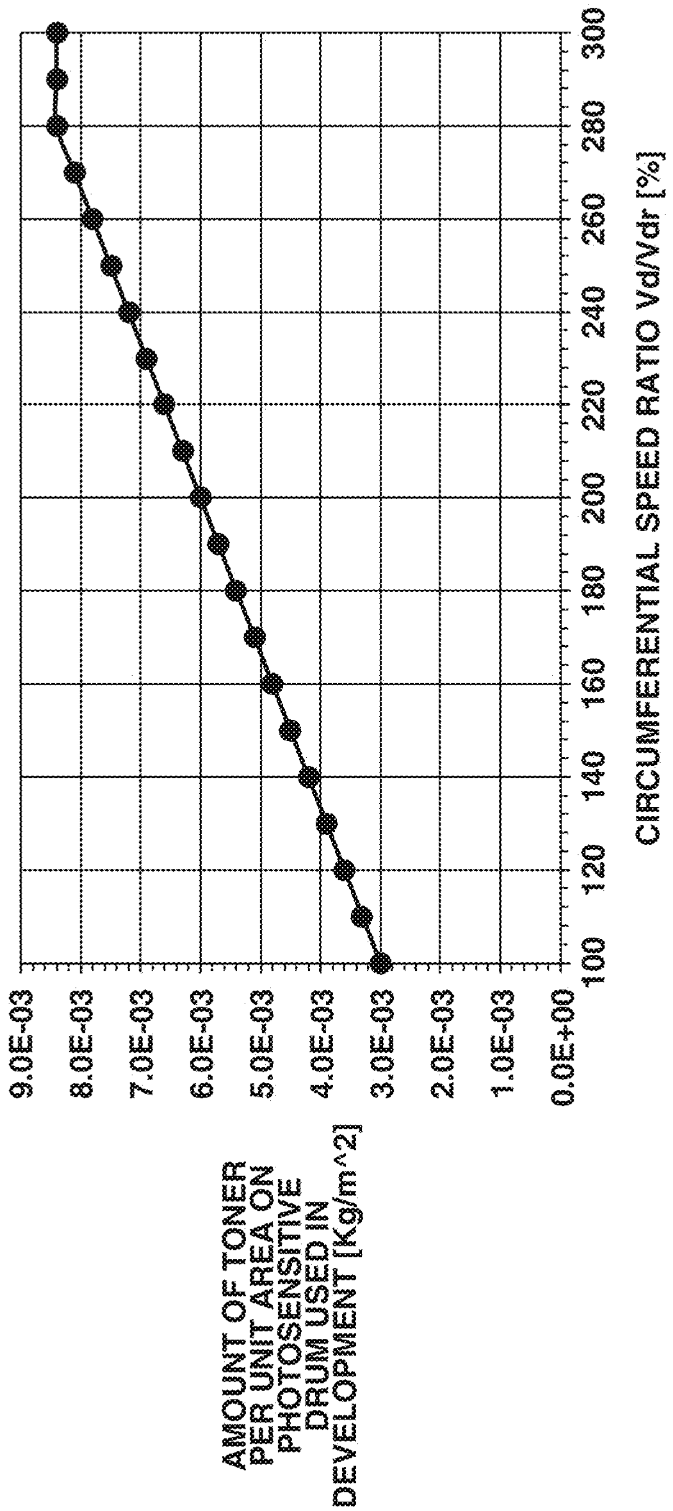
FIG. 2 is a graph of a relationship between circumferential speed ratios and amounts of toner applied according to the first exemplary embodiment.

A wide color gamut image formation mode as a second mode is provided, as described herein. The graph provided in FIG. 2 shows a result obtained by measuring amounts of toner applied per unit area on the photosensitive drum 1 in development while the circumferential speed ratio Vd/Vdr being the ratio of a circumferential speed Vd of the development rollers 5 with respect to a circumferential speed Vdr of the photosensitive drum 1 is changed. Here, the circumferential speed ratio Vd/Vdr is defined as a development circumferential speed ratio. In addition, a toner applied amount, as used below, refers to an amount of toner applied per unit area. Further, the toner applied amount on the photosensitive drum 1, the toner applied amount on the intermediate transfer belt 14, and the toner applied amount on the recording material P, as described herein are assumed to be approximately the same. The potential of the photosensitive drum 1, a development voltage, and an amount of charge to be applied on the toner are set at appropriate timings. In the present exemplary embodiment, the development contrast being a potential difference between the development voltage and the light area potential V1 in the wide color gamut image formation mode is set to 250 V. More specifically, by setting the light area potential V1 in the wide color gamut image formation mode to −50 V, the development contrast is increased to be greater than the development contrast in the normal image formation mode serving as the first mode. As a method of increasing the development contrast, in the present exemplary embodiment, a method of increasing the amount of exposure made by the exposure device 11 is used. It will be appreciated that a development voltage may be varied, or a charging voltage may be changed. As the development circumferential speed ratio Vd/Vdr is increased from 100%, the amount of toner on a photosensitive drum used in development (toner moving from a respective development roller 5 to the photosensitive drum 1) increases. The toner applied amount accordingly increases. Then, in the wide color gamut image formation mode, the toner applied amount is saturated at a circumferential speed ratio of approximately 280%.

Figure 3:
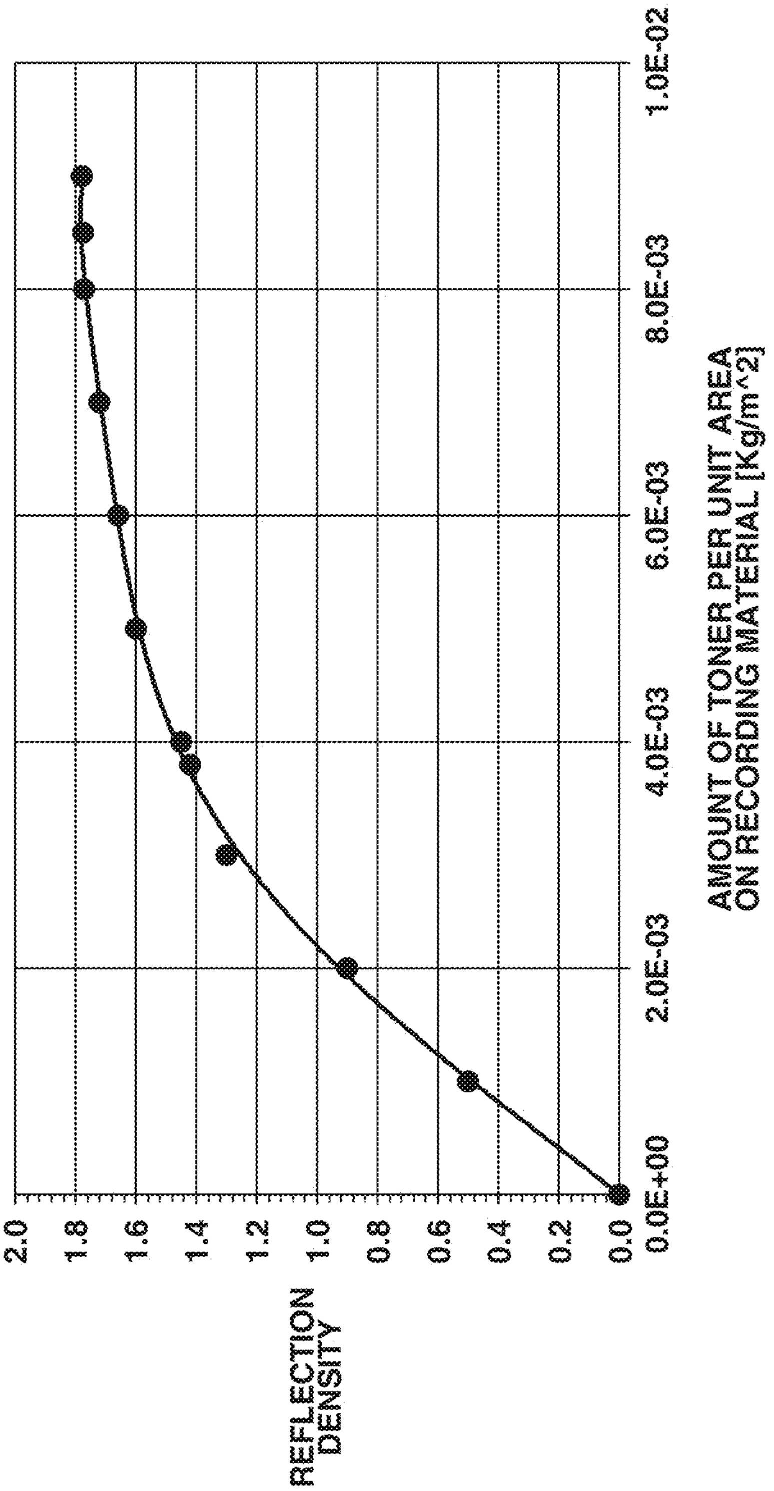
FIG. 3 is a graph of a relationship between amounts of toner applied and reflection densities according to the first exemplary embodiment.

FIG. 3 is a graph of a relationship between amounts of toner applied per unit area on the recording material P and reflection densities measured after the toner images developed on the photosensitive drum 1 are each transferred onto the recording material P and fixed. The reflection densities were measured using a reflection density measuring device model RD-918 manufactured by Macbeth. As an example, FIG. 3 illustrates an example of M toner among the Y, M, C, and Bk toners. As the amount of toner applied on the recording material P increases, the reflection density increases, and the reflection density is saturated when the amount of toner applied on the recording material P is approximately 8E-03 [kg/m^2].

In view of the above result, in the present exemplary embodiment, the normal image formation mode and the wide color gamut image formation mode are set as follows. As the normal image formation mode, a reflection density of approximately 1.45 is sufficient for general office documents. Accordingly, the development circumferential speed ratio between the photosensitive drum 1 and the respective development roller 5 is set to ΔV1=140%, and the maximum amount of toner applied on the recording material P is set to approximately 4.0E-03 [kg/m^2] for a single color. Hereinafter, a toner applied amount in the normal image formation mode will be referred to as a first toner applied amount. As the wide color gamut image formation mode, the development circumferential speed ratio between the photosensitive drum 1 and the development roller 5 is set to ΔV2=280%, and the maximum amount of toner applied on the recording material P is set to approximately 8.0E-03 [kg/m^2] for a single color. Hereinafter, a toner applied amount in the wide color gamut image formation mode will be referred to as a second toner applied amount.

As a method of increasing the development circumferential speed ratio between the photosensitive drum 1 and respective the development roller 5 in the wide color gamut image formation mode to 280% from 140%, which is the development circumferential speed ratio between the photosensitive drum 1 and respective the development roller 5 in the normal image formation mode, the following operations are performed. When the process speed in the normal image formation mode is set to 1/1, the process speed in the wide color gamut image formation mode is set to ½, and the circumferential speed (number of rotations) of the photosensitive drum 1 is set to a half of the circumferential speed in the normal image formation mode, and the circumferential speed (number of rotations) of the development roller 5 is set to the same circumferential speed as that in the normal image formation mode. For example, the circumferential speed of the development roller 5 is fixed to 0.28 [m/s], and the circumferential speed of the photosensitive drum 1 is set to 0.2 [m/s] in the normal image formation mode and to 0.1 [m/s] in the wide color gamut image formation mode. With this setting, as compared with the normal image formation mode, the amount of toner applied to the photosensitive drum 1 from the toner coated over the development roller 5 is increased in the wide color gamut image formation mode. In other words, setting a large rotation circumferential speed ratio between the photosensitive drum 1 and the development roller 5, increases the amount of toner per unit area of the photosensitive drum 1 supplied from the development roller 5. The two effects provide an increase in the amount of toner on the recording material P, enabling images to be printed with high density and wide color gamut.

Further, a configuration may be used of increasing the circumferential speed ratio between the photosensitive drum 1 and the development roller 5 to 280% by increasing the development roller circumferential speed (number of rotations) to twice a process speed of 1/1 while keeping the process speed at 1/1. This case causes the load to be applied on the drive unit 60, as a drive source of the development rollers 5, to increase, which is to increase the fixing performance by, for example, increasing the fixing temperature. However, the image formation time can be shortened as compared with the process speed of ½. In contrast to that, the process speed set to ½ enables avoidance of excessive load on the drive unit 60 of the development roller 5, allowing appropriate fixing without increasing the fixing temperature. For this reason, in the present exemplary embodiment, a setting of decreasing the process speed in the wide color gamut image formation mode is selected. Further, the development circumferential speed ratio can be set as in the present exemplary embodiment by changing both the circumferential speed of the development roller 5 and the circumferential speed of the photosensitive drum 1.

At this time, in order for the wide color gamut image of any type of image data to be appropriately transferred to the recording material P, the transfer setting is to be higher than a transfer voltage (transfer strength) for transferring an image with the maximum amount of toner applied in the normal image formation mode to the recording material P. Thus, the target current in the constant current control of the secondary transfer voltage for the wide color gamut image formation mode is set as a transfer setting 1.

Figure 4:
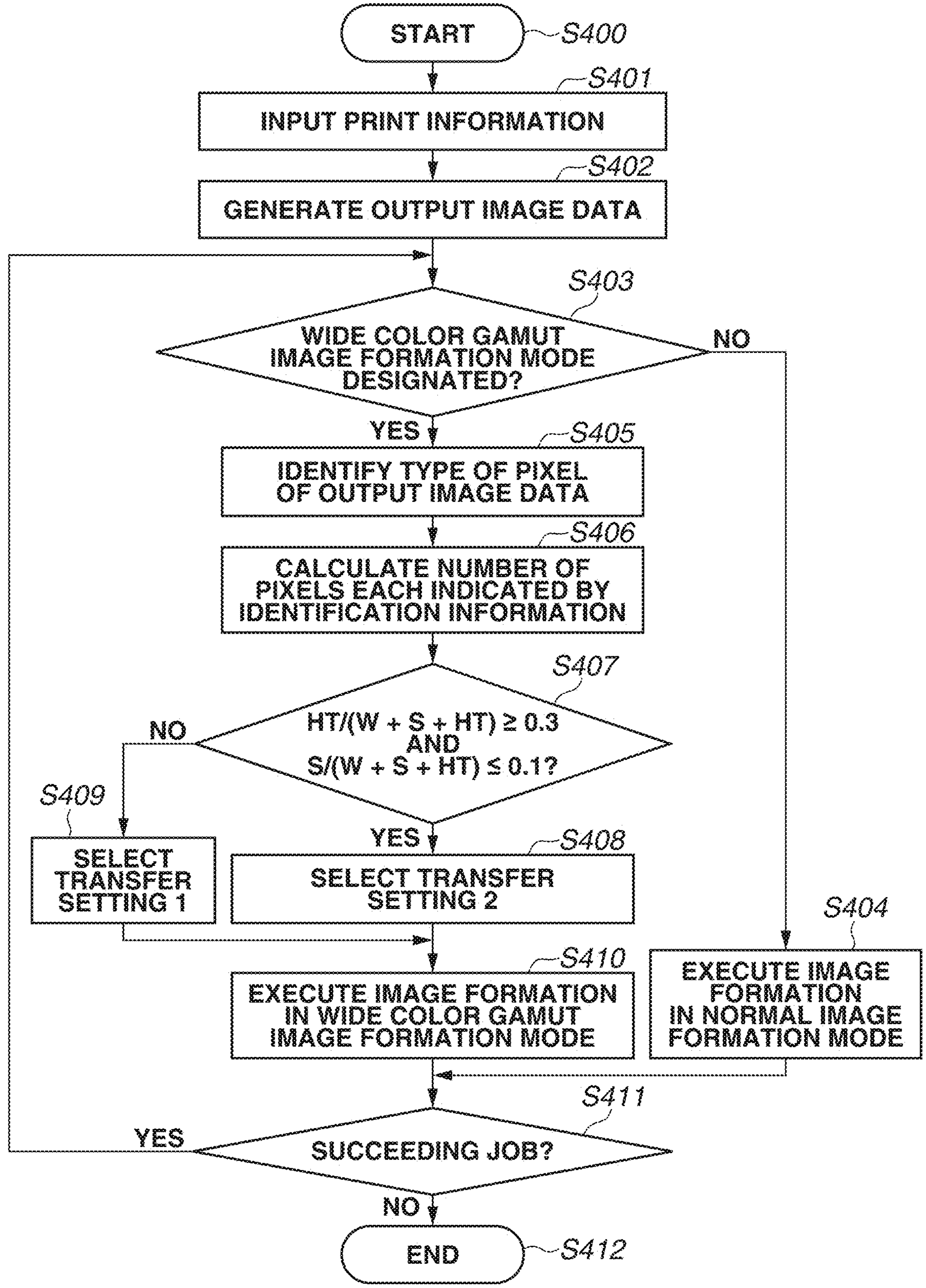
FIG. 4 is a flowchart illustrating an image formation operation of the image forming apparatus according to the first exemplary embodiment.

Hereinafter, an image formation operation to be executed by the image forming apparatus 500 according to the present exemplary embodiment will be described with reference to a flowchart illustrated in FIG. 4.

In step S400, a start operation is initiated and the processing proceeds to step S401. On the start operation, in step S401, print information is input from the host computer 503 to the image forming apparatus 500 together with an instruction of a print mode (the normal image formation mode or the wide color gamut image formation mode), and the processing proceeds to step S402. In step S402, in the image processing unit 504, output image data suitable for the print mode is generated and transmitted to the image analysis unit 43.

In step S403, the image analysis unit 43 determines whether the print mode is the wide color gamut image formation mode. If the print mode is the normal image formation mode (NO in step S403), the image analysis unit 43 transmits the output image data as is, i.e. without modification, to the image buffer 44, and the processing proceeds to step S404. In step S404, the image formation is performed in the normal image formation mode. On the other hand, if the print mode is the wide color gamut image formation mode (YES in step S403), the processing proceeds to step S405. In step S405, the image analysis unit 43 performs an analysis of the configuration of the output image data.

Figure 5:
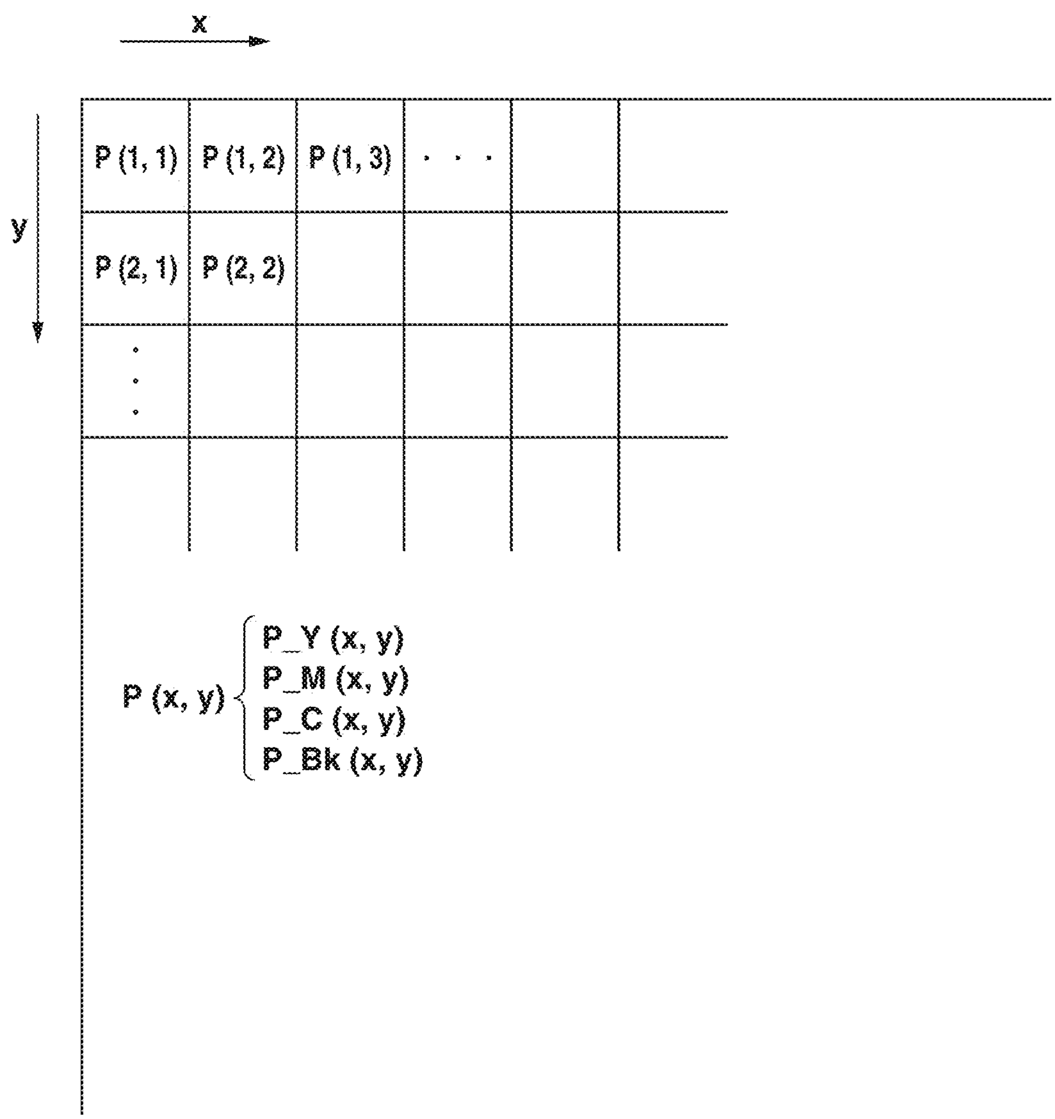
FIG. 5 is a diagram illustrating a configuration of output image data in the image forming apparatus according to the first exemplary embodiment.

The output image data in the present exemplary embodiment has a configuration as illustrated in FIG. 5. P(x, y) indicate one pixel at the position coordinates (x, y) in the output image data, and P(x, y) consists of pieces of image data P_Y(x, y), P_M(x, y), P_Y(x, y), and P_Bk(x, y) that respectively correspond to Y, M, C, and Bk. In the present exemplary embodiment, S(x, y) is provided as identification information indicating the configuration of the pixel P(x, y).

In the image forming apparatus 500 according to the present exemplary embodiment, by increasing, for each color, the toner applied amount for the output image data with 80% color difference histogram (CDh) or more to an amount greater than the first toner applied amount, the effect of the wide color gamut image formation mode is produced. Thus, by determining a pixel with output image data with CDh(=205 dec) or more of one or more colors out of the output image data pieces corresponding to Y, M, C, and Bk of each pixel P(x, y) to be a pixel of a wide color gamut image, S(x, y) is set to 1 (identification number of a wide color gamut image).

On the other hand, it has been revealed that an abnormal electrical discharge image attributed to an intensified transfer electric field is more likely to be generated in a halftone image as a second pattern on the low gradation side compared with an image on the high gradation side as a first pattern represented by a solid image. Halftone images in which an abnormal electrical discharge image is likely to be generated include a pixel with the total of Y, M, C, and Bk colors ranging between 1% and 40% (for example, Y: 0%, M: 20%, C: 20%, Bk: 0%). This corresponds to an image in which the toner applied amount is approximately a half or less of the first toner applied amount of one color. Since image data with 40% is 102 dec, a pixel satisfying P_Y(x, y)+P_M(x, y)+P_Y(x, y)+P_Bk(x, y)≤102 dec, S(x, y) is set to 2 (identification number of a halftone image in which an abnormal electrical discharge image is likely to be generated). S(x, y) of a pixel having a combination of pieces of image data not corresponding to either 1 or 2 is set to 0 (identification number of an image other than the above-described images). Thus, in the present exemplary embodiment, with 102 dec as a boundary, an image with 102 dec or more is defined as high gradation and an image with a value less than 102 dec is defined as low gradation. In this range, an image with 205 dec or more is regarded as a wide color gamut image. For example, for a halftone image with 102 dec or more mixed with a region with 205 dec or more, the region is defined as a high gradation pattern and the halftone image is defined as a low gradation pattern. In other words, the configuration of the present exemplary embodiment is effective, for example, to two image patterns with different gradations mixed therein.

In step S406, the above-described operations are performed on all the pixels of the output image data. Subsequently, in step S407, the values S, HT, and W are obtained, based on Equations (1) and (2):

$$HT/(W+S+HT) \geq 0.3 \tag{1}$$

$$S/(W+S+HT) \leq 0.1, \tag{2}$$

with S=the total number of pixels of which S(x, y) being set to 1, HT=the total number of pixels of which S(x, y) being set to 2, and W=the total number of pixels of which S(x, y) is set to 0. When Equations (1) and (2), are satisfied, it is determined that a small partial region of the output image data corresponds to a wide color gamut image, and in the remaining region, there exists a certain area of a halftone image being an image in which an abnormal electrical discharge image is likely to be generated. Since (W+S+HT) is the sum of the pixels of output image data, (W+S+HT) corresponds to the area of an output image. Equations (1) and (2), above, can be rephrased that a first ratio of a halftone image with respect to one sheet of the recording material P is 30% or more, and a second ratio of a solid image with respect to one sheet of the recording material P is 10% or less. In other words, it is to determine whether the percentage of a solid image as an example of the first pattern is 10% or less with respect to the total, and the percentage of a halftone image as an example of the second pattern is 30% or more with respect to the total. Further, depending on the condition, the transfer control condition may be determined based solely on Equation (1), or may be determined based solely on Equation (2).

Equations (1) and (2) may be calculated from the proportion of the image other than the halftone image, and the proportion of the image other than the solid image. In this case, Equations (3) and (4), as set forth below, are used:

$$(W+S)/(W+S+HT) \leq 0.7 \tag{3}$$

$$(W+HT)/(W+S+HT) \geq 0.9 \tag{4}$$

In Equations (3) and (4), a third ratio of an image other than the halftone image with respect to one sheet of the recording material P is 70% or less, and a fourth ratio of an image other than the solid image with respect to one sheet of the recording material P is 90% or more. In other words, it is to determine whether the percentage of an image other than the solid image as an example of the first pattern is 90% or more with respect to the total, and the percentage of an image other than the halftone image as an example of the second pattern is 70% or less with respect to the total.

Then, in this case, in step S408, a transfer setting of 2 in which the transfer strength of a secondary transfer voltage is decreased from the transfer setting of 1 for the wide color gamut image formation mode is selected. The processing proceeds to step S410. In step S410, the image formation is performed in the wide color gamut image formation mode.

Figure 6A:
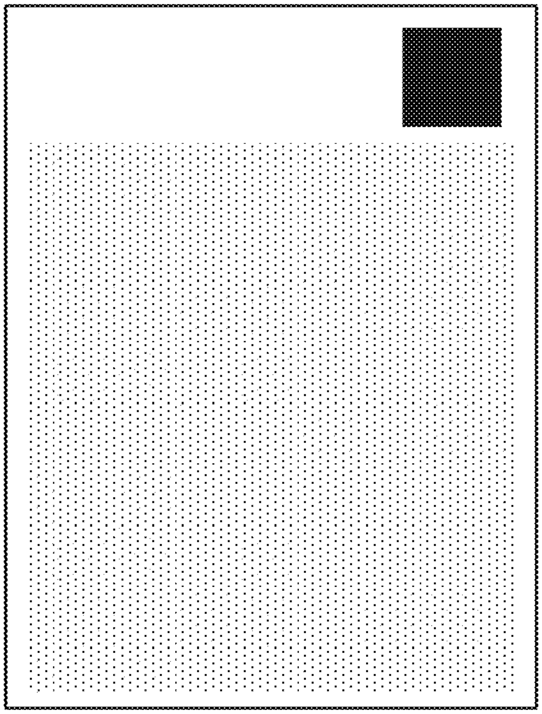
FIGS. 6A and 6B are diagrams illustrating images related to the first exemplary embodiment.
Figure 6B:
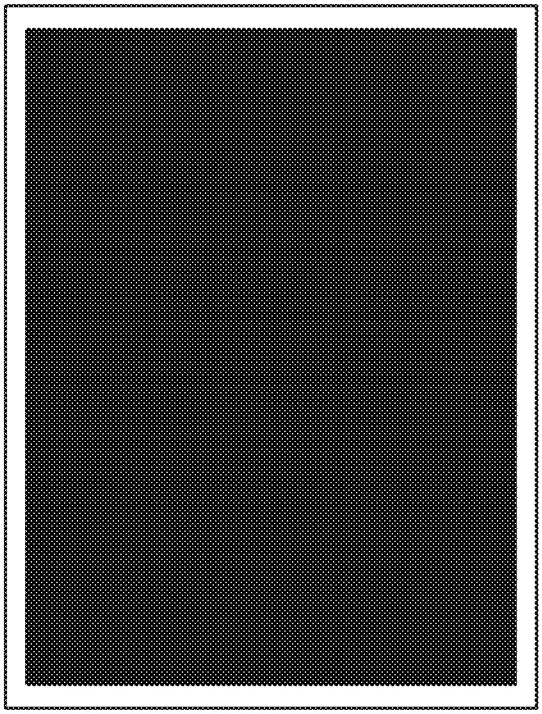

The transfer setting 2 has been determined in the following consideration. Assuming an A4-sized recording material P, a red image of 30 (square with each side being 30 mm) at the upper right of pieces of image data Y: 100% and M: 100%, and a halftone image of C: 40% as illustrated in FIG. 6A were prepared. Using the images illustrated in FIG. 6A and a red image of which the whole surface has Y: 100% and M: 100% as illustrated in FIG. 6B, in the environment with 15° C./10% RH, the images were checked while the secondary transfer voltage setting (target current of the constant current control) was changed in the wide color gamut image formation mode. As the halftone image, an image subjected to dithering processing with approximately 166 lines was used. In this example, the image illustrated in FIG. 6A satisfies the relationships represented by Equations (1) and (2), and the image illustrated in FIG. 6B does not satisfy the relationships represented by Equations (1) and (2).

A result as shown in Table 1, below, was obtained. The target current and the average voltage each indicate the amount of decrease from the reference (transfer setting 1). More specifically, the target current of a setting A is 15.5 μA, and the average transfer voltage at this time is +2.7 kV.

The images were checked with the level of an abnormal electrical discharge image generated in a halftone image (HT) portion with each target current and the color difference (ΔE) between the □30 red image and the whole red image in each target current with respect to the transfer setting 1. Each red image was measured using an exact manufactured by X-Rite, Inc., under the measurement illumination condition M2, and the color difference ΔE was obtained using the CIE 1976 color difference calculation equation by outputting L*a*b*(CIE/L*a*b*) defined by the International Commission on Illumination (CIE), under the condition of a D50 light source and a two-degree field of view.

TABLE 1

| Setting | Target current | Average voltage | □30 red | A4 whole red | Abnormal electrical discharge image |
|---|---|---|---|---|---|
| Transfer Setting 1 | 16.5 μA | 3 kV | — | — | Generated in wide range of HT portion |
| A | −1 μA | −300 kV | ΔE: 0.5 | ΔE: 1.5 | Slightly generated in wide range of HT portion |
| B | −2 μA | −450 kV | ΔE: 0.5 | ΔE: 3.0 | Slightly generated in part of HT portion |
| C | −3 μA | −600 kV | ΔE: 0.8 | ΔE: 4.0 | Not generated |
| D | −4 μA | −750 kV | ΔE: 2.5 | ΔE: 5.0 | Not generated |

While the generation of an abnormal electrical discharge image is prevented by decreasing the target current, an excessively decreased target current increases the color difference of the red image, which changes the color tone. However, the changes in color difference of the □30 red images were more gradual as compared with the whole red images. This tendency was confirmed up to S/(W+S+HT) being 0.1, and the changes in color difference were small in the range from 0.1 (exclusive) to approximately 0.2 (inclusive), so that the numerical value of Equation (2) may be set to 0.2.

In the present exemplary embodiment, in view of the generation situations of an abnormal electrical discharge image, and the changed degree of color difference of the □30 red images, a setting C in Table 1 of decreasing the target current of the constant current control from that in the transfer setting 1 for the normal wide color gamut image formation mode to 3 μA was selected. This condition is defined as the transfer setting 2. At this time, the average voltage (transfer strength) of the transfer voltage was decreased to approximately 600 V. In the present exemplary embodiment, the description is given with the transfer current, and the transfer setting of the secondary transfer voltage is a target current of the constant current control, but can be a target voltage of the constant voltage control.

On the other hand, if the image does not satisfy the conditions of Equations (1) and (2) (NO in step S407), the processing proceeds to step S409. In step S409, the transfer setting 1 is selected. In step S410, the image formation is performed in the wide color gamut image formation mode.

If S is set to 0 in step S407, no data regarding a wide color gamut image exists, and a transfer setting 3 as a setting D in Table 1 can also be selected. The condition of the transfer setting 3 is desirably a setting equal to or exceeding the transfer setting in the normal image formation mode as the first mode, and is a setting with a weaker transfer strength than that in the transfer setting 2. Such a case may be caused in a situation where, while the user may select the wide color gamut image formation mode, a normal image is mixed in the succeeding consecutive job. In this case, the transfer setting 3 enables normal images and wide color gamut images to be favorably output even with the wide color gamut image formation mode selected by a user. In the present exemplary embodiment, the target current of the transfer setting 3 is 12.5 μA, and the average transfer voltage at this time is +2.25 kV. As the transfer setting in the normal image formation mode, the process speed is 1/1, so that the target current is 20.5 μA, and the average transfer voltage at this time is +2.5 kV.

Then, after the image formation is performed in the normal image formation mode (in step S404) or in the wide color gamut image formation mode (in step S410), the processing proceeds to step S411. In step S411, it is checked whether a succeeding job exists. If a succeeding job exists (YES in step S411), the processing returns to step S403, in which it is determined whether the wide color gamut image formation mode is designated for the job. If no succeeding job exists (NO in step S411), the processing proceeds to step S412. In step S412, the image formation operation is ended.

In step S403, the user determines whether the wide color gamut image formation mode is selected, but the control may be performed in such a manner that the switching determination may be automatically performed based on an image pattern.

In other words, in consecutively forming images on sheets of the recording material P, the user may select a mode for each sheet, or a mode may be automatically selected in accordance with the image. For example, if images are consecutively formed on two sheets of the recording material P and the first image is a wide color gamut image and the second image is a normal image, the user may switch the control for each image. If both the first and second images are wide color gamut images and the first image satisfies the condition in step S407, the transfer setting 2 is selected. If the second image does not satisfy the condition in step S407, the transfer setting 1 is selected. In the present exemplary embodiment, to avoid potential disadvantage for the user, it may be desirable to switch the control for each sheet of the recording material P.

In the conventional wide color gamut image formation mode, the secondary transfer voltage is set in such a manner that a toner image can be appropriately transferred even when the area of an image in which the amount of toner applied of a plurality of colors exceeds the first toner applied amount corresponds to the whole of a sheet of the recording material P (the transfer setting 1 in the present exemplary embodiment). However, in the wide color gamut image formation mode, with a smaller area of the region of an image in which the amount of toner applied exceeds the first toner applied amount, an excessive secondary transfer voltage is applied to the region of the image in which the amount of toner applied is equal to or smaller than the first toner applied amount. Further, if the region of the image in which the amount of toner applied is equal to or smaller than the first toner applied amount is a halftone image with a small amount of toner applied thereon, an excessive secondary transfer voltage is applied, which is more likely to generate an abnormal electrical discharge image.

In view of the foregoing, the secondary transfer voltage set as described above makes it possible to output a wide color gamut image without generating an abnormal electrical discharge image irrespective of the configuration of the output image data.

The configuration of the first exemplary embodiment has the following features.

The image forming apparatus 500 that can execute an image formation operation of forming an image on the recording material P includes the photosensitive drum 1 as the rotatable photosensitive drum 1. The image forming apparatus 500 also includes the exposure device 11 that forms an electrostatic latent image on the surface of the photosensitive drum 1 based on output image data. The image forming apparatus 500 also includes the development roller 5 as a rotatable developer bearing member that forms a toner image by supplying the toner as a developer to the surface of the photosensitive drum 1 and developing the electrostatic latent image formed on the surface of the photosensitive drum 1. The image forming apparatus 500 also includes the intermediate transfer belt 14 to which the toner image formed on the surface of the photosensitive drum 1 is transferred at the transfer portion formed by the intermediate transfer belt 14 contacting the surface of the photosensitive drum 1. The image forming apparatus 500 also includes the secondary transfer roller 20 as a secondary transfer member that transfers the toner image transferred to the surface of the intermediate transfer belt 14 to a recording material. The image forming apparatus 500 also includes the drive unit 60 that drives the photosensitive drum 1 and the development roller 5, the secondary transfer power source 74 that applies a secondary transfer voltage to the secondary transfer roller 20, and the image analysis unit 43 as an acquisition unit that acquires information regarding the output image data. The image forming apparatus 500 also includes the control unit 502 that controls the drive unit 60 and the secondary transfer power source 74.

The control unit 502 performs a control to execute the first mode being the normal image formation mode in which the development roller 5 rotates with respect to the photosensitive drum 1 at a first circumferential speed ratio. The control unit 502 also performs a control to execute the second mode being the wide color gamut image formation mode in which the development roller 5 rotates with respect to the photosensitive drum 1 at a second circumferential speed ratio greater than the first circumferential speed ratio. When the image formation operation is executed in the second mode, the control unit 502 performs a control as follows.

i) When information indicating that the output image data includes the first pattern alone, i.e., without including the second pattern, the first pattern of the first gradation is acquired by the image analysis unit 43, and the control unit 502 controls application of a first transfer voltage to transfer a toner image of the first pattern to the recording material P.

ii) When information indicating that the output image data includes the first pattern and the second pattern of a second gradation of the second pattern with lower density than the first gradation is acquired by the image analysis unit 43, and the control unit 502 controls application of a second transfer voltage with an absolute value that is less than the first transfer voltage.

The first transfer voltage and the second transfer voltage are voltages with the opposite polarity to the normal charge polarity of the toner.

The control of a transfer current may be performed instead of the control of a transfer voltage. More specifically, the control unit 502 performs a control as follows.

iii) When information indicating that the output image data includes the first pattern alone of the first gradation is acquired by the image analysis unit 43, the control unit 502 applies a first transfer current to transfer a toner image of the first pattern to the recording material P.

iv) When information indicating that the output image data includes the first pattern and the second pattern of the second gradation of lower density than the first gradation is acquired by the image analysis unit 43, the control unit 502 applies a second transfer current smaller in absolute value than the first transfer current.

When an image formation operation is executed in the second mode on two sheets of the recording material to consecutively be output, the control unit 502 performs a control as follows.

v) When first output image data on a first sheet of the recording material P, which is one of the two sheets of the recording material P, includes the first pattern alone of the first gradation, and the toner image of the first pattern is transferred to the first sheet of the recording material P, the control unit 502 performs a control to apply the first transfer voltage.

vi) When second output image data on a second sheet of the recording material P, which is the other sheet of the two sheets of the recording material P, includes the first pattern and the second pattern of the second gradation of lower density than the first gradation, and the toner image of the first pattern and the second pattern is transferred to the second sheet of the recording material P, the control unit 502 performs a control to apply the second transfer voltage smaller in absolute value than the first transfer voltage.

Typically, the first pattern is a solid image, and the second pattern is a halftone image. When the ratio of the first pattern in one sheet of the recording material P with respect to the sheet of the recording material P in the output image data exceeds the first ratio, the control unit 502 performs a control to apply the first transfer voltage. When the ratio of the second pattern in one sheet of the recording material P with respect to the sheet of the recording material P in the output image data falls below the second ratio, the control unit 502 performs a control to apply the first transfer voltage. In the present exemplary embodiment, for example, the first ratio is 30% and the second ratio is 10%.

Further, when the ratio between the area of the region in the output image data in which the amount of toner applied exceeds a predetermined amount and the area of the output image data is equal to or greater than a predetermined value, the control unit 502 may perform a control to apply the first transfer voltage. With output image data where the ratio is equal to or smaller than the predetermined value, the control unit 502 may perform a control to apply the second transfer voltage.

The above-described configurations and features allows reproduction of favorable color tones in the wide color gamut image formation mode.

An image forming apparatus according to a second exemplary embodiment will now be described. Like numbers refer to like components having similar configurations and functions to those in the first exemplary embodiment, and the description will be omitted.

An abnormal electrical discharge image becomes more likely to be generated as the secondary transfer voltage becomes high voltages. In other words, an abnormal electrical discharge image is more likely to be generated in low-humidity environment where the resistance of recording materials and various members increases. On the other hand, an abnormal electrical discharge image is less likely to be generated in high-humidity environment where the strength of the secondary transfer voltage is lower.

In view of the foregoing, in the present exemplary embodiment, it is determined whether to execute the setting of the secondary transfer voltage in the wide color gamut image formation mode using the absolute water content.

In other words, an environment where the image forming apparatus 500 is installed is determined using the environment sensor 36 illustrated in FIG. 1. The determination is made based on temperature information and an absolute water content calculated using relative humidity information. When the absolute water content is 0.002 [kg/kg'] or less, it is determined to execute the setting of the secondary transfer voltage in the wide color gamut image formation mode. Whether to execute the setting of the secondary transfer voltage may be determined based on temperature information alone or based on relative humidity information alone. In other words, when the temperature or humidity detected by the environment sensor 36 as a detection unit exceeds or falls below a threshold value, the control unit 502 may perform a control as follows. When the output image data includes a first pattern of first gradation and a second pattern of second gradation with lower density than the first gradation, the control unit 502 performs a control to apply the second transfer voltage.

This configuration allows an appropriate secondary transfer voltage to be set in an environment alone where an abnormal electrical discharge image is likely to be generated.

The present disclosure has been described above in accordance with specific exemplary embodiments, but the present disclosure is not limited to the above-described exemplary embodiments.

In the above-described exemplary embodiments, the photosensitive member is not limited to drum-shaped members, and may be a belt-shaped member.

The primary transfer member is not limited to a roller-shaped member, and may be a brush-like member or a sheet-like member.

The dimensions, the materials, and the shapes of the components described in the above-described exemplary embodiments, and their relative arrangement are to be appropriately changed depending on the configuration and various conditions of an apparatus to which the disclosure is applied.

In other words, these are not intended to limit the scope of the present disclosure to the above-described exemplary embodiments.

As values Vdr, Vd, $\Delta V1$, and $\Delta V2$, values other than the above-described values can be used depending on the actual condition of the image forming apparatus 500.

As numerical values used in Equations (1) and (2), numerical values other than these may be used depending on the actual condition of the image forming apparatus 500.

Like the intermediate transfer belt 14, while a configuration of once transferring a toner image to the surface of a belt is employed, a configuration may be employed in which a recording material conveyance belt is employed and a toner image is transferred from the photosensitive drum 1 to the recording material P conveyed by the recording material conveyance belt.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-006650, filed Jan. 19, 2024, which is hereby incorporated by reference herein in its entirety.

What is claimed is:

1. An image forming apparatus that executes an image formation operation for forming an image on a recording material, the image forming apparatus comprising:

a rotatable image bearing member;

an exposure unit configured to form an electrostatic latent image on a surface of the image bearing member based on output image data;

a rotatable developer bearing member configured to form a toner image by supplying a developer to the surface of the image bearing member and developing the electrostatic latent image formed on the surface of the image bearing member;

an intermediate transfer member to which the toner image formed on the surface of the image bearing member is transferred at a transfer portion, the transfer portion being formed by the intermediate transfer member contacting the surface of the image bearing member;

a transfer member configured to transfer the toner image transferred to a surface of the intermediate transfer member to the recording material;

a drive unit configured to drive the image bearing member and the developer bearing member;

a transfer voltage application unit configured to apply a transfer voltage to the transfer member;

an acquisition unit configured to acquire information regarding the output image data; and a control unit configured to control the drive unit and the transfer voltage application unit, wherein the control unit is configured to control execution of a first mode in which the developer bearing member rotates with respect to the image bearing member at a first speed, and a second mode in which the developer bearing member rotates with respect to the image bearing member at a second speed greater than the first speed, and wherein when the control unit controls execution of the image formation operation in the second mode:

i) in response to the acquired information indicating that the output image data includes a first pattern without including a second pattern, a first gradation of the first pattern is acquired by the acquisition unit and the control unit controls application of a first transfer voltage to transfer the toner image of the first pattern to the recording material, and ii) in response to the acquired information indicating that the output image data includes the first pattern and the second pattern, a second gradation of the second pattern with lower density than the first gradation is acquired by the acquisition unit and the control unit controls application of a second transfer voltage with an absolute value less than the first transfer voltage to transfer the toner image of the first pattern and the second pattern to the recording material.

2. An image forming apparatus that executes an image formation operation for forming an image on a recording material, the image forming apparatus comprising:

a rotatable image bearing member;

an exposure unit configured to form an electrostatic latent image on a surface of the image bearing member based on output image data;

a rotatable developer bearing member configured to form a toner image by supplying a developer to the surface of the image bearing member and developing the electrostatic latent image formed on the surface of the image bearing member;

an intermediate transfer member to which the toner image formed on the surface of the image bearing member is transferred at a transfer portion, the transfer portion being formed by the intermediate transfer member contacting the surface of the image bearing member;

a transfer member configured to transfer the toner image transferred to a surface of the intermediate transfer member to the recording material;

a drive unit configured to drive the image bearing member and the developer bearing member;

a transfer voltage application unit configured to apply a transfer voltage to the transfer member; and a control unit configured to control the drive unit and the transfer voltage application unit, wherein the control unit is configured to control execution of a first mode in which the developer bearing member rotates with respect to the image bearing member at a first circumferential speed ratio, and a second mode in which the developer bearing member rotates with respect to the image bearing member at a second circumferential speed ratio greater than the first circumferential speed ratio, and wherein, in a case where the control unit controls execution of the image formation operation in the second mode to consecutively output two sheets of the recording material:

i) in response to output of first image data on a first sheet of the recording material, the first sheet being one of the two sheets of the recording material, with a first pattern of a first gradation, the toner image of the first pattern is transferred to the first sheet of the recording material, the control unit controls application of a first transfer voltage, and ii) in response to output of second image data on a second sheet of the recording material, the second sheet being another sheet of the two recording materials, with the first pattern and a second pattern of a second gradation with lower density than the first gradation, the toner image of the first pattern and the second pattern is transferred to the second recording material, and the control unit controls application of a second transfer voltage with an absolute value less than the first transfer voltage.

3. The image forming apparatus according to claim 1, wherein the first pattern is a solid image and the second pattern is a halftone image.

4. The image forming apparatus according to claim 1, wherein, in response to a case where a ratio of the first pattern in one sheet of the recording material with respect to an image forming area of the one sheet of the recording material in the output image data exceeds a first ratio, the control unit controls application of the first transfer voltage.

5. The image forming apparatus according to claim 1, wherein, in a case where a ratio of the second pattern in one sheet of the recording material with respect to an image forming area of the one sheet of the recording material in the output image data is less than or equal to a second ratio, the control unit controls application of the first transfer voltage.

6. The image forming apparatus according to claim 4, wherein the first ratio is 30%.

7. The image forming apparatus according to claim 5, wherein the second ratio is 10%.

8. The image forming apparatus according to claim 1, further comprising a detection unit configured to detect at least one of a temperature or a humidity, wherein in a case where the image formation operation is executed in the second mode with the at least one of the temperature or the humidity detected by the detection unit exceeding or falling below a threshold value, and information indicating that the output image data includes the first pattern of the first gradation and the second pattern of the second gradation with lower density than the first gradation is acquired by the acquisition unit, the control unit controls application of the second transfer voltage to transfer the toner image of the first pattern and the second pattern to a recording material.

9. The image forming apparatus according to claim 1, wherein the first transfer voltage and the second transfer voltage have an opposite polarity to a normal charge polarity of the developer.

10. The image forming apparatus according to claim 1, wherein an amount of toner applied per unit area on the recording material in the first pattern is greater than an amount of toner applied per unit area on the recording material in the second pattern.

11. The image forming apparatus according to claim 10, wherein the control unit controls application of the first transfer voltage in a case where a ratio between an area of a region in the output image data, with the area in which the amount of toner is applied exceeding a predetermined amount, and an area of the output image data is greater than or equal to a predetermined value, and wherein the control unit controls application of the second transfer voltage in response to the ratio being less than the predetermined value.

12. The image forming apparatus according to claim 2, wherein the first pattern is a solid image and the second pattern is a halftone image.

13. The image forming apparatus according to claim 2, wherein the first transfer voltage and the second transfer voltage have a polarity opposite to a normal charge polarity of the developer.

14. The image forming apparatus according to claim 2, wherein an amount of toner applied per unit area on the recording material in the first pattern is greater than an amount of toner applied per unit area on the recording material in the second pattern.

15. The image forming apparatus according to claim 14, wherein the control unit controls application of the first transfer voltage in response to a ratio between an area of a region in the output image data, with the area in which the amount of toner is applied exceeding a predetermined amount, and an area of the output image data that is greater than or equal to a predetermined value, and wherein the control unit controls application of the second transfer voltage in response to the ratio being less than the predetermined value.

* * * * *